Patented Feb. 4, 1936

2,029,970

UNITED STATES PATENT OFFICE 2,029,970

YARN

Leo Wallerstein, Rowland A. Gale, and Thomas G. Hawley, Jr., New York, N. Y., assignors to Wallerstein Company Inc., a corporation of New York No Drawing. Application April 26, 1934, Serial No. 722,506

2 Claims. (Cl. 91—68)

The present invention relates to the manufacture of silk fabrics, particularly from natural silk in gum. Raw silk, as is ordinarily obtained from Japan to the United States is encased in its natural gum. It is desirable to keep this gum upon the fibres throughout the textile forming operations, such as winding, doubling, twisting, knitting, and/or weaving, since the added body which this gives to the silk has been found particularly desirable in many operations.

This raw silk largely is received in this country in skeins and these skeins are unwound and then subjected to winding, doubling and twisting. This twisted yarn is then utilized for knitting purposes. In knitting it is desirable that a certain amount of moisture be applied to the threads so as to make them bend more readily and form more satisfactory loops in the knitting operation. The natural silk on the gum is not particularly water-absorbent and it is particularly difficult to make it take up a desirable amount of water by the usual methods.

To improve the moisture absorbing qualities of the gum coating on the raw silk, it has been found desirable to impregnate the silk, preferably in the form of its skeins, before winding, doubling, and/or twisting by hygroscopic agents, such as glycerine and/or by the application of wetting out agents, such as sulphonated oils. Both of these methods, however, are in reality merely surface applications.

The quantity of these wetting-out agents or hygroscopic agents which may be utilized is limited since the gum will only take up relatively small quantities thereof, and moreover, these agents are not only expensive but from many aspects may be undesirable to have present in certain manufacturing operations.

It has now been found that the gum of the silk may be rendered highly absorbent, by treatment of such silk with certain types of enzymatic preparations, particularly of a proteolytic nature. These proteolytic enzyme solutions or preparations are preferably applied in the form of a bath to the silk skeins, with the addition of wetting-out agents, such as sulphonated oils for proper enzyme distribution. These proteolytic enzyme compositions appear to cause a physical change in the sericin or silk gum making it highly porous so that it will absorb water in a manner similar to a sponge. The increase in absorbent properties of the gum by reason of the proteolytic treatment is much more satisfactory than when the hygroscopic agents or wetting-out agents are employed. For example, silk which has been impregnated with hygroscopic agents will always take up moisture from the atmosphere and will always be moist and damp.

According to the present process, however, the silk after having been made absorbent with treatment of the enzymatic composition remains dry and does not tend to absorb moisture from the air. In addition, the enzymatic treatment of the present invention actually increases the amount of moisture absorbent surface on the gum coating, while according to the prior methods employing hygroscopic agents and/or wetting-out agents, the moisture absorbing surface is no greater than before.

In the preferred procedure, the natural silk in yarn or skein form, is dipped into a bath of a temperature below 50° C., said bath containing in solution and/or in suspension the proteolytic enzyme preparation with which may be preferably combined the alkali metal salt or salts of a high molecular weight fatty acid or fatty acids, or the alkali metal salt of high molecular weight, sulphuric or sulphonic acids of aliphatic, aromatic, and alicyclic compounds of high molecular weight; sulfonated oils; or other wetting-out agents. Some raw oil is generally emulsified in the solution for lubricating purposes.

Among the compounds which may be used are sodium oleate, sodium palmitate, sodium stearate, sodium hexadecyl sulphonate, neat's-foot oil, Turkey red oil, raw vegetable oils, such as olein, and so forth.

The skein or yarn may be suspended in the soaking bath for a sufficient length of time to assure that the anzyme preparation and the other ingredients have thoroughly penetrated the gum in the silk, and at all times the temperature and pH should be so maintained that substantially no degumming action results.

The soaking may be carried out from 30 minutes to 16 hours, and it preferably should not be carried out for longer than 24 hours. The skein or yarn after being so impregnated with the enzyme preparation is centrifuged so as to remove as much moisture as possible and then is thoroughly or partly dried before being subjected to further textile forming operations.

Various protease preparations may be used in carrying out the process, such as protease preparations derived from micro-organisms which under suitable culture conditions develop proteolytic enzymes, as for instance, preparations derived from Aspergillus oryzæ, from cultivation of bacteria, such as B. mesentericus, B. mycoides, or B. subtilis, or Mucor delemar, Amylomyces, Rouxii, Penecillium, and so forth. Other suitable proteolytic enzymes may be used, such as papain, bromelin, malt enzymes, trypsin, or pepsin. Suitable mixtures of the above described enzymes may also be used.

As examples in carrying out the process, one may proceed as follows:

*Example 1.*—100 pounds of raw silk are soaked from 30 minutes to 1 hour in a bath or solution consisting of 400 pounds of water in which have been dissolved 50 pounds of the bacterial enzyme preparation, 1 pound of sodium sulfite for effecting a suitable pH, and 1 pound of sulfonated oil, this latter material being used to effect a better penetration, or as it is technically called, a wetting-out of the fibre, though it will be understood that other penetrants can be used for effecting this wetting-out such as a small amount of soap.

If the soaking period is increased, the amount of enzyme may be decreased, as for example, with over-night soaking only half as much enzyme is required.

Other suitable pH regulators, for instance, sodium carbonate or bicarbonate, or a mixture thereof, may be used instead of the sodium sulfite referred to.

Emulsions of common soaking oils, such as neat's foot oil, may also be used in conjunction with enzymes.

The temperature at which this process is carried out may be advantageously varied with the time consumed in the operation, the nature or origin of the silk, the nature of the particular enzyme employed, and the presence of other constituents, such as pH regulators. However, we generally employ this process at room temperature, that is, from 60 to 85° F.

The silk is then removed from the enzyme bath and the adhering liquor is removed in any suitable manner, as by centrifuging, and after the centrifuging step the silk fibres are dried at a low temperature by an air blast or any other suitable method.

*Example 2.*—100 pounds of 13/15 Japan white silk in the gum are soaked for 30 minutes at room temperature in 400 pounds of water solution containing 5 pounds of papain, 4 pounds of sulfonated oil, 0.05 pound of potassium cyanide, and 2 pounds of mono-sodium phosphate. It is then centrifuged and air dried.

*Example 3.*—100 pounds of 13/15 Japan white silk in the gum are soaked for 30 minutes at room temperature in 400 pounds of water solution containing 5 pounds of pancreatin, 1 pound of sodium sulfite, and suitable penetrants and oils. It is then centrifuged and air dried.

The present application is a continuation in part of application Serial No. 606,286, filed April 19, 1932, and is similar in subject matter to copending applications Serial Nos. 722,504, 722,505, 722,507 and 722,508, all filed April 26, 1934.

The present application is particularly directed to yarns for knitting, weaving and other textile processing, in which the natural silk in gum has been treated to give it enhanced moisture absorptive properties.

What is claimed is:

1. A yarn composed of natural silk in gum and impregnated with a proteolytic enzyme, said yarn having enhanced absorptive properties and the gum on said yarn having substantially the original body-giving properties in respect to textile processing, said yarn being particularly adapted for knitting, weaving, and other textile operations.

2. A process of enhancing yarns to adapt them for knitting, weaving, and other textile processing, which consists in impregnating natural silk in gum with a proteolytic enzyme and leaving the gum in substantially its original condition in respect to body-giving conditions after such impregnation and which comprises immersing the natural silk in gum in an aqueous bath containing the enzyme at about room temperature and at a temperature below 50° C. for between thirty minutes to twenty-four hours, then removing the enzyme-impregnated natural silk in gum and drying the same.

LEO WALLERSTEIN.
ROWLAND A. GALE.
THOMAS G. HAWLEY, Jr.